United States Patent
Crye et al.

(10) Patent No.: US 6,832,461 B2
(45) Date of Patent: Dec. 21, 2004

(54) EXPANDABLE STRUCTURE

(75) Inventors: Caleb Clark Crye, Brooklyn, NY (US); Eric Owen Fehlberg, Queens, NY (US)

(73) Assignee: LineWeight LLC, Brooklyn, NY (US)

( * ) Notice: Subject to any disclaimer, the term of this patent is extended or adjusted under 35 U.S.C. 154(b) by 343 days.

(21) Appl. No.: 10/061,950

(22) Filed: Jan. 31, 2002

(65) Prior Publication Data

US 2003/0101682 A1 Jun. 5, 2003

Related U.S. Application Data

(60) Provisional application No. 60/265,837, filed on Feb. 1, 2001.

(51) Int. Cl.$^7$ ................................................. E04C 2/32
(52) U.S. Cl. ............................... 52/783.19; 52/783.17; 52/793.11; 423/116
(58) Field of Search ........................ 52/783.11, 783.17, 52/783.19, 793.1, 793.11, 783.13; 428/12, 116

(56) References Cited

U.S. PATENT DOCUMENTS

| | | | |
|---|---|---|---|
| 3,633,326 A | 1/1972 | McKnight et al. | |
| 3,752,089 A | * 8/1973 | Bartels | ........................ 108/161 |
| 3,951,730 A | * 4/1976 | Wennberg et al. | .......... 428/116 |
| 4,606,959 A | 8/1986 | Hillinger | |
| 5,006,391 A | 4/1991 | Biersach | |
| 5,040,696 A | * 8/1991 | Liebel | .................... 229/122.32 |
| 5,102,272 A | * 4/1992 | Woods et al. | ................ 410/154 |
| 5,215,248 A | 6/1993 | Moser | |
| 5,486,078 A | * 1/1996 | Wise et al. | .................. 410/155 |
| 5,573,818 A | * 11/1996 | Haywood et al. | .............. 428/12 |
| 5,683,781 A | 11/1997 | Komarek et al. | |
| 5,875,596 A | 3/1999 | Muller | |
| 6,183,836 B1 | * 2/2001 | Pflug | .......................... 428/116 |

* cited by examiner

Primary Examiner—Carl D. Friedman
Assistant Examiner—Yvonne M. Horton
(74) Attorney, Agent, or Firm—Stiennon & Stiennon

(57) ABSTRACT

A top sheet and a bottom sheet are connected together by wing members, each having a center segment hinged to the top sheet and to the bottom sheet about parallel axes. Wings protrudes from the center segments and are biased to project out of a plane defined between the hinge axes. In a collapsed condition the top and bottom sheets are close together with the wings distorted from their relaxed positions. In the expanded condition the sheets are spaced apart and the wings return to their relaxed positions projecting out from the center segments and conferring stiffness on the structural member and resisting the return of the member to its collapsed configuration. In storage, the sheets are secured along the edges with an underlying rip cord, and may be rolled. The wings may be formed as part of metal or plastic spring members.

31 Claims, 3 Drawing Sheets

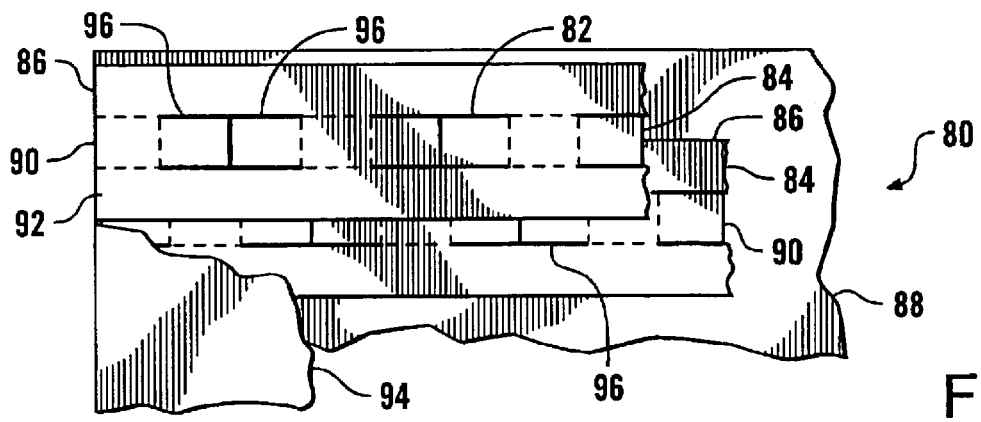
FIG. 6
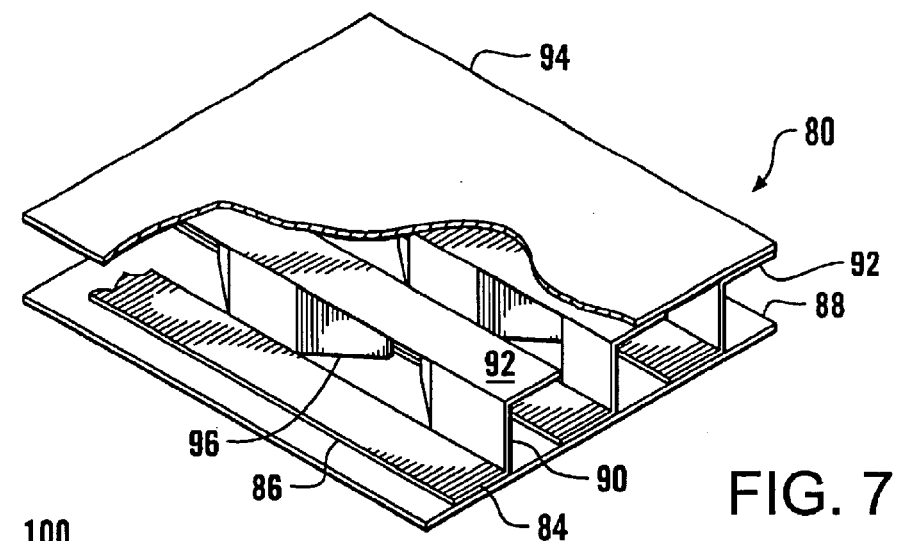
FIG. 7
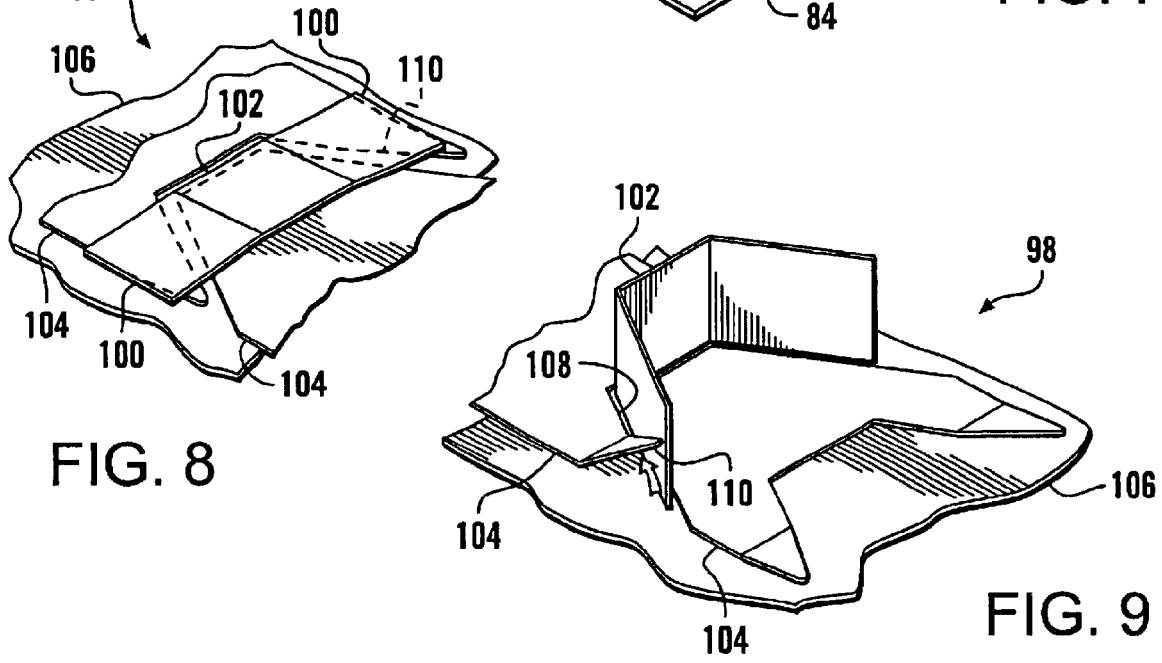
FIG. 8
FIG. 9

EXPANDABLE STRUCTURE

CROSS REFERENCES TO RELATED APPLICATIONS

This application claims the benefit of the filing date of U.S. Provisional Application No. 60/265,837 filed Feb. 1, 2001, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to structures and support members in general, and more particularly to structures which may be readily erected from a compact configuration to an expanded configuration of substantially greater stiffness.

Conventional building materials such as plywood, wood timbers, steel trusses, concrete blocks, etc., can be specified to give the desired stiffness and load carrying capacity for a particular project. These conventional materials are adequate for applications where transportation costs are low. A wide variety of engineered materials have been developed which maximize the stiffness to weight ratio for applications where structural weight is the chief concern. For example, interior structures in aircraft and spacecraft should be as lightweight as possible for a desired stiffness. Moreover, the transport costs are generally a function of mass and the additional cost of a high stiffness-to-weight-ratio building member can be justified. Corrugated cardboard, foam core board, and honeycomb board are examples of some stiff but lightweight planar building members.

Yet mass is only one constraint limiting transport capacity—the other is volume. A honeycomb board, for example, demonstrates exceptional stiffness for its weight, with the result that most of the volume of the honeycomb board is air. On board aircraft, marine craft, and land vehicles, cargo-carrying volume is usually strictly limited. In instances where it is necessary to move building materials rapidly or to have quantities of building materials readily on hand with minimal storage capacity, it would be desirable to have stiff building materials which are easy to work with, of adequate strength, and which occupy minimal volume during shipping and storage.

SUMMARY OF THE INVENTION

The structural member of this invention in a preferred embodiment has two parallel sheets, a top member and a bottom member, which are connected together by a plurality of wing members. Each wing member has a center segment which is hinged to the top member and to the bottom member about parallel hinge axes. At least one wing protrudes from each center segment and is biased to project out of the plane defined between the hinge axes of the center segment. For example, the wings may be formed as curved or angled extensions from the center segment in a plastic or metal spring. The structural member is transformable from a first, collapsed, condition to a second, expanded condition. In the collapsed condition, the top member is close to the bottom member, with the wing members compressed between the two sheets and the wings distorted out of their relaxed positions. In the expanded condition, the top member is spaced from the bottom member and the wings, in their relaxed positions, project out of the planes of the center segments and confer substantial stiffness to the structural member. The wing members may be fabricated as independent units, or may be constructed as a series of biased wings on continuous strips of material.

The structural members may be retained in the collapsed condition by an adhesive binding or tape which wraps the edges of the structural member and extends from the top member to the bottom member. A quick release cord or wire may be positioned beneath the tape such that the structure may be expanded without the use of tools. Locking tabs may be formed on one of the top or bottom members to contribute to retaining the structural member in its expanded erect configuration. The collapsed structural member may be stored as sheets, or rolled up into rolls. The structural members may be used in military and remote construction applications, for example as short bridges, roof members, foxhole liners, furniture, elevated walkways, shelters, flooring, ladders, stairs, ramps, and craft.

It is a feature of the present invention to provide a structural member which is readily transformed from a collapsed condition to an expanded condition.

It is another feature of the present invention to provide a structural member which, when expanded from a collapsed condition, does not have a tendency to return to the original collapsed condition.

It is an additional feature of the present invention to provide an expandable structural member which may be stored in rolls.

It is also a feature of the present invention to provide a structural member which may be fabricated from a wide range of materials.

Further objects, features and advantages of the invention will be apparent from the following detailed description when taken in conjunction with the accompanying drawings.

BRIEF DESCRIPTION OF THE DRAWINGS

FIG. 6 is a top plan view, partially broken away in section of an alternative embodiment structural member of this invention have a plurality of wing members formed as parts of continuous tapes.

FIG. 7 is an isometric view, partially broken away in section, of the structural member of FIG. 6.

FIG. 8 is a fragmentary isometric view of an alternative embodiment structural member of this invention having locking tabs shown in a collapsed condition.

FIG. 9 is a fragmentary isometric view of the structural member of FIG. 8 in an expanded condition.

DESCRIPTION OF THE PREFERRED EMBODIMENTS

Figure 1:
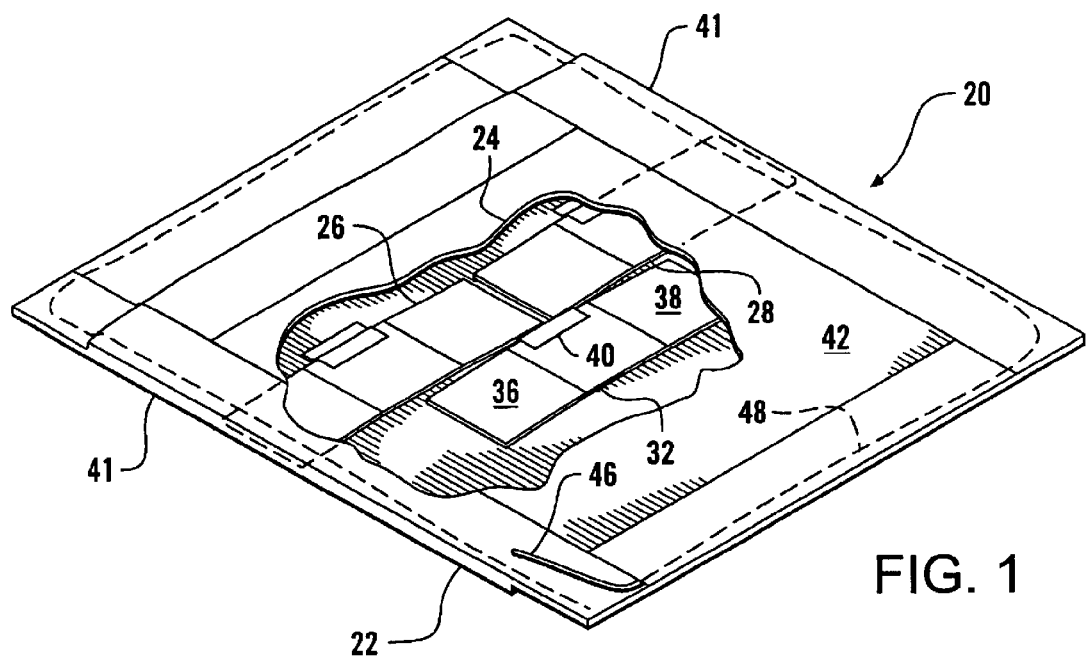
FIG. 1 is an isometric view, partially broken away in section, of the structural member of this invention in a collapsed state.
Figure 2:
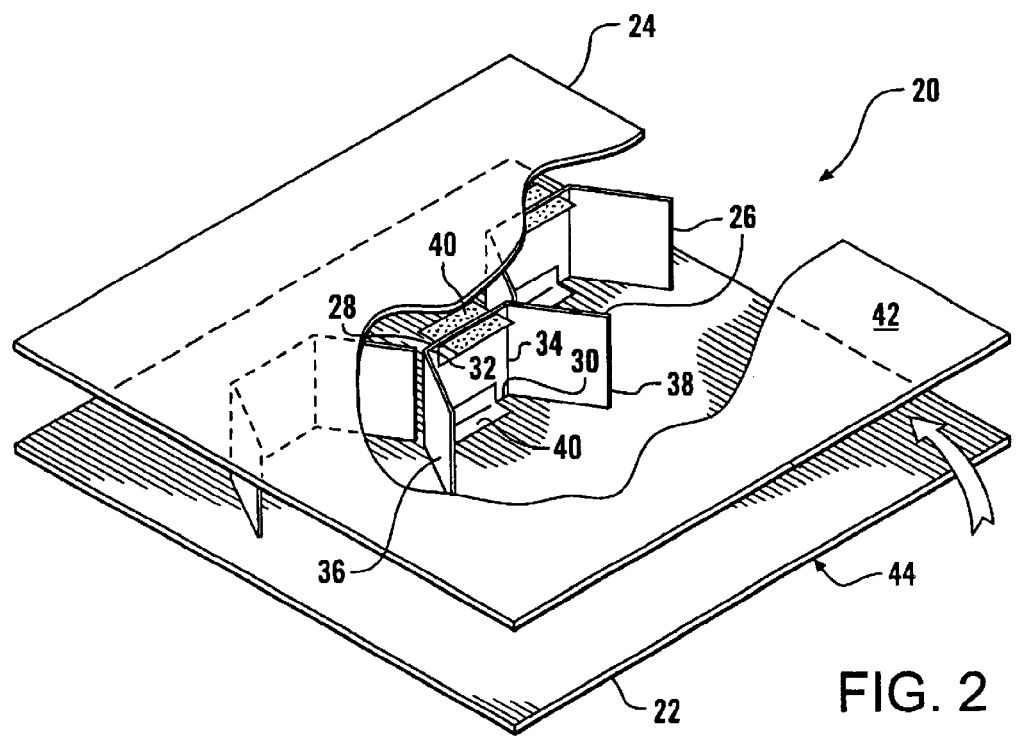
FIG. 2 is an isometric view, partially broken away in section, of the structural member of FIG. 1 in an expanded state.

Referring more particularly to FIGS. 1–9, wherein like numbers refer to similar parts, a structural member 20 is shown in FIGS. 1 and 2. The structural member 20 is constructed in a collapsed or shipping configuration as shown in FIG. 1, and is expandable into an erect or expanded configuration as shown in FIG. 2. As shown in FIG. 1, the structural member 20 has a bottom member 22 which is positioned beneath a top member 24 and connected to the top member by an array of wing members 26. The top member 24 and the bottom member 22 may be rectangular constant thickness planar sheets. In the collapsed configuration, the top member 24 closely overlies the bottom member 22. Each wing member 26 has a center segment 28 which is hinged to the bottom member 22 along a first hinge axis 30 and hinged to the top member 24 along a second hinge axis 32. The pivotable or hinged connection between the center segments and the top member and bottom member may be formed by strips of flexible adhesive tape 40, or by molded hinge elements, or by multipart mechanical hinges or by other conventional pivoting connections. The first hinge axis 30 and the second hinge axis 32 are parallel to one another and define a first plane 34. In the illustrated embodiment, all the hinge axes are substantially parallel to one another. Where space permits, each wing member 26 has a first wing 36 which extends from one side of the center segment 28 and a second wing 38 which extends from the other side of the center segment.

Each wing member 26 is fabricated so that the wings 36, 38 are biased to project out of the first plane. This biasing may be achieved by forming the wing members 26 as springs. Thus, in the collapsed configuration the wings 36, 38 are distorted from their relaxed positions with respect to the center segment 28, and are flattened substantially between the top member 24 and the bottom member 22. As shown in FIG. 1, in the collapsed configuration the top member 24 is offset from, but aligned with the bottom member 22. To retain the structural member 20 in the collapsed state until such time as it is ready to be deployed, the edges of the top member 24 and the bottom member 22 are connected together, for example by adhesive tape 41 which wraps over the top surface 42 of the top member and the bottom surface 44 of the bottom member 22. A pull cord 48 may be positioned beneath the tape 41 to extend around the perimeter of the structural member 20. A free end 46 of the pull cord 48 extends from beneath the tape 41. The tape 41, or other fasteners, holds the top member against the bottom member with the wing members 26 under compression therebetween.

To expand the structural member 20, the collapsed assembly is positioned on the ground and the pull cord 48 is pulled to sever the tape 41. The top member 24 then springs up and forward away from the bottom member 22 and stops at approximately one half the final spacing of the top and bottom members. The user then tugs on the top member 24 to bring the center segments 28 approximately perpendicular to both the top member and the bottom member. The top member is displaced with respect to the bottom member along the same axis along which the wings are biased with respect to the center segments. In the embodiment shown, the top member is displaced in a direction which is opposite to the movement of the wings when going from their compressed to relaxed state. When the top member and bottom member are in the erect positions, the wings are biased to return to their relaxed, uncompressed, state, as shown in FIG. 2. In the relaxed state, the wings 36, 38 extend in planes perpendicular to the top member 24 and the bottom member 26. When viewed from above, the wings 36, 38 extend from the center segments 28 at approximately a 60 degree angle. When the wings 36, 38 are fully extended the structural member is in its expanded and fully erect condition. In this locked configuration, the structural member 20 will not return to its original flat collapsed condition without the use of additional tools. Even if the structural member 20 is loaded to the point of failure, it will not return to its original collapsed configuration. Until the structural member 20 has progressed to its locked configuration, it is still possible to recompress it into its collapsed condition without tools. However, once the wings are fully deployed, collapse is strongly resisted. The structural member 20 may be constructed, for example, with polycarbonate sheets for the top member and the bottom member, with the wing members being formed of nylon sheets of about 1/16th inch thickness, attached to the polycarbonate sheets with adhesive tape.

As shown in FIG. 2, the wing members 26 are preferably arranged in an array to approximate a hexagonal cellular pattern. The wings of the wing members 26 in one row extend to the center segments of wing members in the adjacent row ahead. It should be noted that other placements of the wing members 26 are possible to achieve a similar arrangement of the center segments and the wings. For example, two wing members may be hinged to the top member and the bottom member 26 with their center segments 28 positioned back-to-back and adjacent one another, such that the wings of one wing member extend toward the wings of the wing member in the preceding row.

Figure 4:
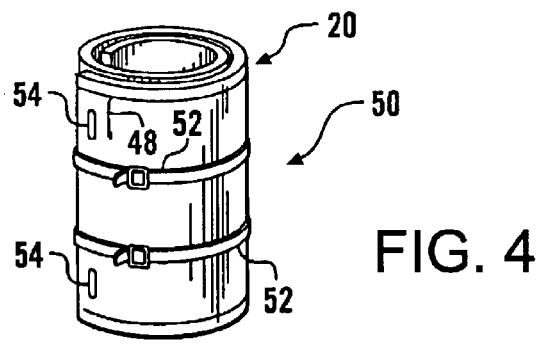
FIG. 4 is an isometric view of a structural member of this invention in a collapsed and rolled condition.
Figure 5:
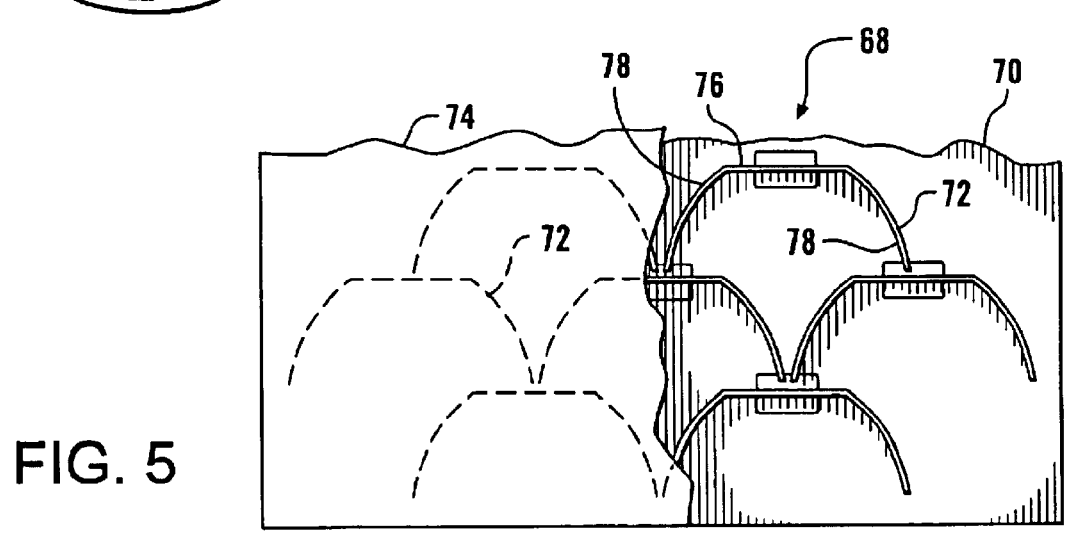
FIG. 5 is a top plan view, partially broken away in section of an alternative embodiment structural member of this invention having curved wing members.

The structural member 20 may be constructed of differing materials and of differing sizes. For example, the structural member may be formed in 4-foot by 8-foot sheets to serve as flooring, roofing, or wall members. In its collapsed condition, the structural member 20 may be flexible, permitting it to be stored in rolls 50, as shown in FIG. 4. Although the edges of the structural member may still be held in place with tape, the entire roll may be held in its rolled configuration with straps or bands 52. The structural members 20 may be assembled into rolls as discrete elements of unit length, or as a single continuous member which may be cut to length as needed. In addition, openings 54 may be formed in the ends of the structural members to serve as hand holds for convenient manipulation of the structural member.

Figure 3:
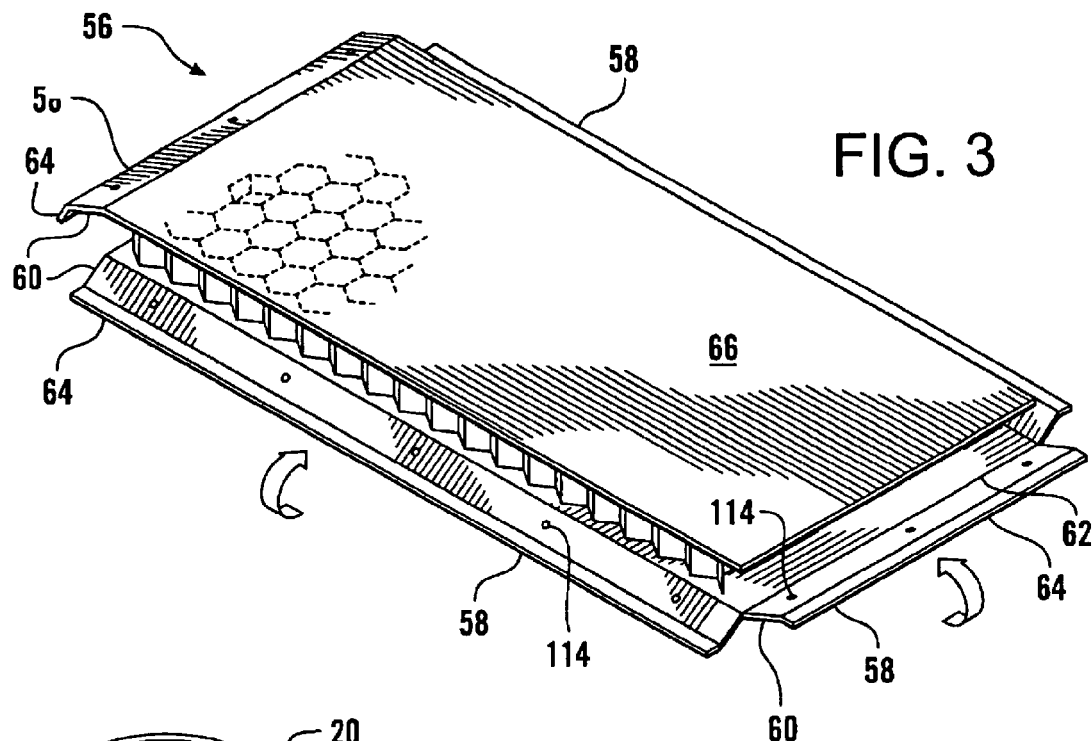
FIG. 3 is an isometric view of a structural member of this invention having edge finish flaps.

As shown in FIG. 3, a structural member 56 may be provided with edge finish tabs 58 which permit the ends of the structural member 56 to be sealed. Each edge finish tab comprises an end wall 60 which is hinged to the bottom wall 62 or top wall 66 of the structural member and a fastening flap 64 which is hinged to the end wall 60. The fastening flap 64 is coated with a pressure sensitive adhesive and covered with a peel-off release layer, not shown. When the structural member 56 is in its collapsed configuration, the end wall 60 and fastening flap 64 of each edge finish tab 58 is folded back to lie adjacent to the underside of the bottom wall 62. After erection, the edge finish tabs are rotated to bring the exposed adhesive of the fastening flaps 64 into engagement with the top wall 66. The end walls 60 may have fasteners 114 attached to face outwardly, to allow one structural member 56 to be connected to a similar structural member 56 positioned alongside.

The wing members 26 may be formed in various shapes. In the structural member 20 shown in FIGS. 1–2, the wing members 26 have three similar rectangular segments: the center segment and the two wings 36, 38. The wing members may be fabricated from a variety of materials capable of having a bias imposed, for example steel, and various plastics. Depending on the economics of forming and the structural requirements of a particular application, the wing members may be formed to have curved wings, as shown in the structural member 68 of FIG. 5. The wings 78 are curved about an axis which is generally perpendicular to the hinge axes which connect the center segment to the top member and the bottom member. The structural member 68 has a bottom member 70 to which wing members 72 are hingedly connected, for example by strips of adhesive tape. A top member 74 is hingedly connected to the wing members 72. Each wing member 72 has a generally planar center segment 76 with two curved wings 78 which extend outwardly from the center segment 76 at an angle approximating 60 degrees. The curved wings 78 impart additional stiffness to the structural member. Other geometries may be used in forming the wing members, for example the wings and center segments may have an undulating or corrugated pattern.

Another alternative embodiment structural member 80 is shown in FIGS. 6–7. The structural member 80 has wing members 82 which are formed in continuous strips 84 which extend the width of the structural member. As shown in FIG. 6, each strip has three parallel sections: a bottom attachment section 86 which is fixed to the bottom member 88, a wing section 90 which is hinged to the bottom attachment section, and a top attachment section 92 which is hinged to the wing section and fixed to the underside of a top member 94. Individual wings 96 are punched or cut from the wing section 90 and are formed to have a bias out of the plane of the wing section. In the collapsed configuration shown in FIG. 6, a first strip 84 is positioned to partially overlie a second strip 84. When the top member 94 is moved with respect to the bottom member 88 to bring the structural member 80 into its erect configuration, the wings 96 are biased away from the plane of the wing section 90 and serve to stiffen the structural member 80. The strips 84 may be generally identical, but offset from each other by one wing width to obtain a pattern of wings which approximates hexagonal cells. Depending on the material used to form the strips and the top and bottom members, various connection methods may be used, including adhesive, welding, ultrasonic welding, heat-staking, mechanical fasteners, etc.

The structural member 20, although it will not return to its collapsed state under normal loads, may be collapsed with the intervention of a specialized tool. One such tool is a series of parallel rods supported and fixed on a first side piece at the same spacing as the wing members in the array within the structural member 20. To collapse an erect structural member 20, the rods are inserted between the top member 24 and the bottom member, and a second side piece having holes formed in it corresponding to each rod, is engaged with the free ends of the rods as they protrude from the structural member, to thus form a comb with a defined spacing of rods. The rods are engaged simultaneously against the upper portions of the center segments of the wing members, and the two side pieces are moved in the direction of the wings, thereby causing the center segments to pivot, and distorting the wings to allow the wing members to be folded down and the entire structural member 20 to be collapsed.

Additional stiffness may be provided in a structural member 20, 80 by applying closely spaced beads of a two-part epoxy to the interior surfaces of the top member and bottom member, the beads extending the length of the top and bottom members perpendicular to the center segments of the wing members. When in the collapsed configuration, the wings of the wing members do not move with respect to the top member and bottom member, and the two parts of the epoxy resin remain separate. When the wings rotate into the erect position the upper and lower edges of the wings will scrape across the two parts of the epoxy causing the epoxy to mix and, in a short time, set up, yielding a stiff connection between the wings and the top and bottom members. Such an adhesive attachment will foreclose the collapse of the structural member.

It will be noted that, in most instances, the height of each wing will be slightly less than the total spacing between the top member and the bottom member to facilitate movement of the wings. However, depending on the materials used for the top and bottom members and the wings, and the amount of bias imposed on the wings, the height of the wings may be made as great as or greater than the distance between the bottom member and the top member, where it is possible for the wings to actually deform the top and bottom members as they expand to their more relaxed conditions. For example, a wing made of a harder material may deform a more resilient material, such as corrugated cardboard.

As shown in FIGS. 8 and 9, a structural member 98 may be provided with slots formed to restrict the movement of the wings 100 of a wing member and to add to the stiffness of the erect structural member 98. Each wing member 102 is hinged to a base section 104 which is fastened to the bottom member 106 of the structural member 98. The base section 104 extends away from the wing member 102 and terminates in resilient triangular tabs 110 which project outwardly from the bottom member 106 and which are biased in the upwardly projecting position. The base section 104 defines a narrow gap with the wings 100 where it is connected to the wing member 102. Thus, a narrow slot 108 is defined between the base section 104 to which the wing member 102 is attached and the tab 110 of the next wing member's base section.

In the collapsed configuration, as shown in FIG. 8, the wings 100 overlie and compress the tabs 110. When the top member, not shown, is moved to bring the structural member 98 into its erect configuration, as shown in FIG. 9, the wings 100 pass over the ramp-like tabs 110 and extend into the slots 108. However, the resilient tabs 110 resume their upwardly protruding orientation after the wings have passed over them, and serve to limit the travel of the erect wings 100.

It should be noted that the structural members of this invention may be formed in shapes other than rectangular and may have differing width to height ratios of the embodiments shown. Narrow structural members may be used as beams, while wide structural members may be employed as flooring, roofing, ceiling tiles, wall members, deck members, portions of aircraft, furniture, shelters of shed or geodesic dome design, bridges, foxhole liners, bunker roofs and walls, ladders and ramps, etc.

In addition, the wing members may be composite structures formed of differing materials. For example, in a structural member similar to the one shown in FIGS. 6 and 7, the bottom attachment section and the top attachment section and spaced webs of the wing section may be formed from plastic, while the wings themselves may be formed of metal springs fastened to the center segments to define the wings and to project through openings between the webs of the wing section. In addition, the center segments of the wing members may be formed with protrusions to more securely engage the wings of adjacent wing members, to further reduce the possible movement of the wings in the erect structural members. Furthermore, the wings need not be formed as inherently biased elements, but may be formed of a material that is merely hinged to the center segments, with the biasing provided by a spring element attached between the wing and the center segment, for example a wire spring attached thereto.

The wing members may also be formed with large tabs extending from the top and the bottom of the center segments for convenient attachment to the top member and the bottom member. The tabs may pivot either toward or away from the biased direction of the wings to permit the wings to extend toward or away from the next adjacent wing member.

It is understood that the invention is not limited to the particular construction and arrangement of parts herein illustrated and described, but embraces all such modified

We claim:

1. A structural member comprising:
a top member;
a bottom member extending generally parallel to and beneath the top member; and
a plurality of wing members positioned between the top member and the bottom member;
wherein each wing member has a center segment which is hinged to the bottom member to pivot about a first axis and hinged to the top member to pivot about a second axis which is parallel to the first axis; and
wherein at least one wing extends from each wing member center segment along a wing axis which extends between and is perpendicular to both the first axis and the second axis, the at least one wing being biased to move about said wing axis to project out of a first plane defined between the first axis and the second axis, such that the structural member is transformable from a first collapsed condition to an expanded condition in which the wings project out of the first planes to thereby support the top member above the bottom member and to resist the return of the structural member to the collapsed condition.

2. The structural member of claim 1 wherein the top member and the bottom member are planar sheets.

3. The structural member of claim 1 wherein all the first axes and the second axes of the plurality of wing members are parallel.

4. The structural member of claim 1 further comprising a fastener which connects the top member to the bottom member in the first collapsed condition.

5. The structural member of claim 1 wherein the at least one wing member is a part of a strip having three sections, a bottom attachment section which is fixed to the bottom member, a wing section which is hinged to the bottom attachment section along a first hinge axis, and a top attachment section which is hinged to the wing section along a second hinge axis and fixed to an underside of the top member, wherein the first hinge axis is parallel to the second hinge axis, and wherein the wing section has a plurality of wings.

6. The structural member of claim 1 wherein in the first collapsed condition the structural member is rolled into a roll.

7. A structural member comprising:
a top member;
a bottom member extending generally parallel to and beneath the top member; and
a plurality of wing members positioned between the top member and the bottom member, wherein each wing member has a center segment which is hinged to the bottom member to pivot about a first axis and hinged to the top member to pivot about a second axis which is parallel to the first axis, and wherein at least one wing extends from each wing member center segment and is biased to project out of a first plane defined between the first axis and the second axis, such that the structural member is transformable from a first collapsed condition to an expanded condition in which the wings project out of the first planes to thereby support the top member above the bottom member and to resist the return of the structural member to the collapsed condition, wherein the wing members are positioned to approximate a hexagonal cell pattern extending between the top member and the bottom member.

8. A structural member comprising:
a top member;
a bottom member extending generally parallel to and beneath the top member; and
a plurality of wing members positioned between the top member and the bottom member, wherein each wing member has a center segment which is hinged to the bottom member to pivot about a first axis and hinged to the top member to pivot about a second axis which is parallel to the first axis, and wherein at least one wing extends from each wing member center segment and is biased to project out of a first plane defined between the first axis and the second axis, such that the structural member is transformable from a first collapsed condition to an expanded condition in which the wings project out of the first planes to thereby support the top member above the bottom member and to resist the return of the structural member to the collapsed condition, wherein each wing is curved about an axis which is perpendicular to the first and second axis.

9. A structural member comprising:
a top member;
a bottom member extending generally parallel to and beneath the top member; and
a plurality of wing members positioned between the top member and the bottom member, wherein each wing member has a center segment which is hinged to the bottom member to pivot about a first axis and hinged to the top member to pivot about a second axis which is parallel to the first axis, and wherein at least one wing extends from each wing member center segment and is biased to project out of a first plane defined between the first axis and the second axis, such that the structural member is transformable from a first collapsed condition to an expanded condition in which the wings project out of the first planes to thereby support the top member above the bottom member and to resist the return of the structural member to the collapsed condition, further comprising a fastener which connects the top member to the bottom member in the first collapsed condition, wherein the fastener comprises at least one segment of adhesive tape, and wherein a cord is disposed beneath the adhesive tape with at least one protruding free end, such that pulling the cord severs the tape and permits the top member to be displaced from the bottom member.

10. A structural member comprising:
a top member;
a bottom member extending generally parallel to and beneath the top member;
a plurality of wing members positioned between the top member and the bottom member, wherein each wing member has a center segment which is hinged to the bottom member to pivot about a first axis and hinged to the top member to pivot about a second axis which is parallel to the first axis, and wherein at least one wing extends from each wing member center segment and is biased to project out of a first plane defined between the first axis and the second axis, such that the structural member is transformable from a first collapsed condition to an expanded condition in which the wings project out of the first planes to thereby support the top member above the bottom member and to resist the return of the structural member to the collapsed condition; and at least one edge finish tab extending from a selected member of the top member and the bottom member, the at least one edge finish tab comprising:

an end wall which is hinged to the selected member; and a fastening flap which is hinged to the end wall, wherein in the first collapsed condition the at least one edge finish tab is folded back to lie adjacent to the outside surface of the selected member, and wherein in the erected configuration, the at least one edge finish tab is rotated to bring the fastening flap into engagement with the top member or the bottom member which is opposite the selected member, and affixed thereto.

11. The structural member of claim 10 further comprising at least one fastener mounted to the fastening flap of the at least one edge finish tab, the at least one fastener being positioned to engage a like fastener on another structural member positioned alongside.

12. A structural member comprising:

a top member;

a bottom member extending generally parallel to and beneath the top member; and a plurality of wing members positioned between the top member and the bottom member, wherein each wing member has a center segment which is hinged to the bottom member to pivot about a first axis and hinged to the top member to pivot about a second axis which is parallel to the first axis, and wherein at least one wing extends from each wing member center segment and is biased to project out of a first plane defined between the first axis and the second axis, such that the structural member is transformable from a first collapsed condition to an expanded condition in which the wings project out of the first planes to thereby support the top member above the bottom member and to resist the return of the structural member to the collapsed condition a base section fixed to the bottom member having a projecting resilient tab corresponding to each wing, the tabs being biased in an upwardly projecting position, a slot being defined adjacent each tab, such that in the first collapsed condition, each tab is overlain by a wing, and in the expanded configuration each wing passes over a tab to be engaged within one of the slots.

13. A structural member comprising:

a top member;

a bottom member extending generally parallel to and beneath the top member; and at least one strip having three sections, a bottom attachment section which is fixed to the bottom member, a wing section which is hinged to the bottom attachment section along a first hinge axis, and a top attachment section which is hinged to the wing section along a second hinge axis and fixed to the underside of the top member, wherein the first hinge axis is parallel to the second hinge axis, and wherein the wing section has a plurality of wings, each wing extending from a center segment along a wing axis which extends between and is perpendicular to both the first axis and the second axis, each wing being biased to move about said wing axis to project out of a plane defined between the first axis and the second axis, such that the structural member is transformable from a first collapsed condition to an expanded condition in which the wings project out of the first plane to thereby support the top member above the bottom member and to resist the return of the structural member to the collapsed condition.

14. The structural member of claim 13 wherein the top member and the bottom member are planar sheets.

15. The structural member of claim 13 wherein all the first axes and the second axes of the plurality of wing members are parallel.

16. The structural member of claim 13 further comprising a fastener which connects the top member to the bottom member in the first collapsed condition.

17. The structural member of claim 13 wherein in the first collapsed condition the structural member is rolled into a roll.

18. A structural member comprising:

a top member;

a bottom member extending generally parallel to and beneath the top member; and at least one strip having three sections, a bottom attachment section which is fixed to the bottom member, a wing section which is hinged to the bottom attachment section along a first hinge axis, and a top attachment section which is hinged to the wing section along a second hinge axis and fixed to the underside of the top member, wherein the first hinge axis is parallel to the second hinge axis, and wherein the wing section has a plurality of wings, each wing extending from a center segment and being biased to project out of a plane defined between the first axis and the second axis, such that the structural member is transformable from a first collapsed condition to an expanded condition in which the wings project out of the first plane to thereby support the top member above the bottom member and to resist the return of the structural member to the collapsed condition, wherein the wing members are positioned to approximate a hexagonal cell pattern extending between the top member and the bottom member.

19. A structural member comprising:

a top member;

a bottom member extending generally parallel to and beneath the top member; and at least one strip having three sections, a bottom attachment section which is fixed to the bottom member, a wing section which is hinged to the bottom attachment section along a first hinge axis, and a top attachment section which is hinged to the wing section along a second hinge axis and fixed to the underside of the top member, wherein the first hinge axis is parallel to the second hinge axis, and wherein the wing section has a plurality of wings, each wing extending from a center segment and being biased to project out of a plane defined between the first axis and the second axis, such that the structural member is transformable from a first collapsed condition to an expanded condition in which the wings project out of the first plane to thereby support the top member above the bottom member and to resist the return of the structural member to the collapsed condition, wherein each wing is curved about an axis which is perpendicular to the first and second axes.

20. A structural member comprising:

a top member;

a bottom member extending generally parallel to and beneath the top member;

at least one strip having three sections, a bottom attachment section which is fixed to the bottom member, a wing section which is hinged to the bottom attachment section along a first hinge axis, and a top attachment section which is hinged to the wing section along a second hinge axis and fixed to the underside of the top member, wherein the first hinge axis is parallel to the second hinge axis, and wherein the wing section has a plurality of wings, each wing extending from a center segment and being biased to project out of a plane defined between the first axis and the second axis, such that the structural member is transformable from a first collapsed condition to an expanded condition in which the wings project out of the first plane to thereby support the top member above the bottom member and to resist the return of the structural member to the collapsed condition; and a fastener which connects the top member to the bottom member in the first collapsed condition, wherein the fastener comprises at least one segment of adhesive tape, and wherein a cord is disposed beneath the adhesive tape with at least one protruding free end, such that pulling the cord severs the tape and permits the top member to be displaced from the bottom member.

21. A structural member comprising:

a top member;

a bottom member extending generally parallel to and beneath the top member;

at least one strip having three sections, a bottom attachment section which is fixed to the bottom member, a wing section which is hinged to the bottom attachment section along a first hinge axis, and a top attachment section which is hinged to the wing section along a second hinge axis and fixed to the underside of the top member, wherein the first hinge axis is parallel to the second hinge axis, and wherein the wing section has a plurality of wings, each wing extending from a center segment and being biased to project out of a plane defined between the first axis and the second axis, such that the structural member is transformable from a first collapsed condition to an expanded condition in which the wings project out of the first plane to thereby support the top member above the bottom member and to resist the return of the structural member to the collapsed condition; and at least one edge finish tab extending from a selected member of the top member and the bottom member, the at least one edge finish tab comprising:

an end wall which is hinged to the selected member; and a fastening flap which is hinged to the end wall, wherein in the first collapsed condition the at least one edge finish tab is folded back to lie adjacent to the outside surface of the selected member, and wherein in the erected configuration, the at least one edge finish tab is rotated to bring the fastening flap into engagement with the top member or the bottom member which is opposite the selected member, and affixed thereto.

22. The structural member of claim 21 further comprising at least one fastener mounted to the fastening flap of the at least one edge finish tab, the at least one fastener being positioned to engage a like fastener on another structural member positioned alongside.

23. A structural member comprising:

a planar top member;

a planar bottom member extending generally parallel to and beneath the top member; and a plurality of wing members positioned between the top member and the bottom member, wherein each wing member has a center segment which is connected to the bottom member to pivot about a first axis and connected to the top member to pivot about a second axis which is parallel to the first axis, and wherein the first axis and second axis of each center segment defines a first plane, and wherein at least one wing extends from each wing member center segment about a wing axis which extends between and is perpendicular to both the first axis and the second axis, and is biased to move about said wing axis to project out of the first plane, such that the structural member is transformable from a collapsed condition in which the at least one wing extends generally parallel to the top member and the bottom member, and an expanded condition in which each at least one wing projects out of the first planes to thereby support the top member above the bottom member and to resist the return of the structural member to the collapsed condition, wherein in the expanded condition the top member is shifted in the front to back axis from its position with respect to the bottom member in the collapsed condition.

24. The structural member of claim 23 further comprising a fastener which connects the top member to the bottom member in the first collapsed condition.

25. The structural member of claim 23 wherein in the first collapsed condition the structural member is rolled into a roll.

26. A structural member comprising:

a planar top member;

a planar bottom member extending generally parallel to and beneath the top member; and a plurality of wing members positioned between the top member and the bottom member, wherein each wing member has a center segment which is connected to the bottom member to pivot about a first axis and connected to the top member to pivot about a second axis which is parallel to the first axis, and wherein the first axis and second axis of each center segment defines a first plane, and wherein at least one wing extends from each wing member center segment and is biased along a front and back axis to project out of the first plane, such that the structural member is transformable from a collapsed condition in which the at least one wing extends generally parallel to the top member and the bottom member, and an expanded condition in which each at least one wing projects out of the first planes to thereby support the top member above the bottom member and to resist the return of the structural member to the collapsed condition, wherein in the expanded condition the top member is shifted in the front to back axis from its position with respect to the bottom member in the collapse condition, wherein the wing members are positioned to approximate a hexagonal cell pattern extending between the top member and the bottom member.

27. A structural member comprising:

a planar top member;

a planar bottom member extending generally parallel to and beneath the top member; and a plurality of wing members positioned between the top member and the bottom member, wherein each wing member has a center segment which is connected to the bottom member to pivot about a first axis and connected to the top member to pivot about a second axis which is parallel to the first axis, and wherein the first axis and second axis of each center segment defines a first plane, and wherein at least one wing extends from each wing member center segment and is biased along a front to back axis to project out of the first plane, such that the structural member is transformable from a collapsed condition in which the at least one wing extends generally parallel to the top member and the bottom member, and an expanded condition in which each at least one wing projects out of the first planes to thereby support the top member above the bottom member and to resist the return of the structural member to the collapsed condition, wherein in the expanded condition the top member is shifted in the front to back axis from its position with respect to the bottom member in the collapsed condition, wherein each wing is curved about an axis which is perpendicular to the first and second axis.

28. A structural member comprising:

a planar top member;

a planar bottom member extending generally parallel to and beneath the top member; and a plurality of wing members positioned between the top member and the bottom member, wherein each wing member has a center segment which is connected to the bottom member to pivot about a first axis and connected to the top member to pivot about a second axis which is parallel to the first axis, and wherein the first axis and second axis of each center segment defines a first plane, and wherein at least one wing extends from each wing member center segment and is biased along a front to back axis to project out of the first plane, such that the structural member is transformable from a collapsed condition in which the at least one wing extends generally parallel to the top member and the bottom member, and an expanded condition in which each at least one wing projects out of the first planes to thereby support the top member above the bottom member and to resist the return of the structural member to collapsed condition, wherein in the expanded condition the top member is shifted in the front to back axis from its position with respect to the bottom member in the collapsed condition, and a fastener which connects the top member to the bottom member in the first collapsed condition, wherein the fastener comprises at least one segment of adhesive tape, and wherein a cord is disposed beneath the adhesive tape with at least one protruding free end, such that pulling the cord severs the tape and permits the top member to be displaced from the bottom member.

29. A structural member comprising:

a planar top member;

a planar bottom member extending generally parallel to and beneath the top member;

a plurality of wing members positioned between the top member and the bottom member, wherein each wing member has a center segment which is connected to the bottom member to pivot about a first axis and connected to the top member to pivot about a second axis which is parallel to the first axis, and wherein the first axis and second axis of each center segment defines a first plane, and wherein at least one wing extends from each wing member center segment and is biased along a front and back axis to project out of the first plane, such that the structural member is transformable from a collapsed condition in which the at least one wing extends generally parallel to the top member and the bottom member, and an expanded condition in which each at least one wing projects out of the first planes to thereby support the top member above the bottom member and to resist the return of the structural member to the collapsed condition, wherein in the expanded condition the top member is shifted in the front to back axis from its position with respect to the bottom member in the collapse condition; and a base section fixed to the bottom member having a projecting resilient tab corresponding to each wing, the tabs being biased in an upwardly projecting position, a slot being defined adjacent each tab, such that in the first collapsed condition, each tab is overlain by a wing, and in the expanded configuration each wing passes over a tab to be engaged within one of the slots.

30. A structural member comprising:

a top member;

a bottom member extending beneath the top member;

an array of a plurality of wing members, each wing member comprising:
  a center segment pivotably connected about a first axis to the bottom member, and pivotably connected about a second axis to the top member, a first plane being defined by the first axis and the second axis;
  a first wing extending sidewardly of the center segment on a first side, and biased to project from the center segment out of the first plane; and
  a second wing extending sidewardly of the center segment on a second side spaced from the first side, and biased to project from the center segment out of the first plane, wherein in a first collapsed configuration the top member is spaced a first distance from the bottom member, and in a second expanded configuration the top member is spaced a second, greater, distance from the bottom member, and the first wings and the second wings are biased out of the first planes.

31. The structural member of claim 30 wherein each wing is curved about an axis which is perpendicular to the first and second axis.

* * * * *